(12) United States Patent
Han et al.

(10) Patent No.: US 11,426,925 B2
(45) Date of Patent: Aug. 30, 2022

(54) 3D PRINTER CALIBRATION

(71) Applicants: AON3D INC., Montreal (CA); Kevin Han, Montreal (CA); Julien Sirois, Montreal (CA)

(72) Inventors: Kevin Han, Montreal (CA); Julien Sirois, Montreal (CA)

(73) Assignees: AON3D INC., Montreal (CA); Kevin Han, Montreal (CA); Julien Sirois, Montreal (CA)

( * ) Notice: Subject to any disclaimer, the term of this patent is extended or adjusted under 35 U.S.C. 154(b) by 0 days.

(21) Appl. No.: 17/040,522

(22) PCT Filed: Mar. 29, 2019

(86) PCT No.: PCT/US2019/024997
§ 371 (c)(1),
(2) Date: Sep. 22, 2020

(87) PCT Pub. No.: WO2019/191683
PCT Pub. Date: Oct. 3, 2019

(65) Prior Publication Data
US 2021/0008790 A1    Jan. 14, 2021

Related U.S. Application Data

(60) Provisional application No. 62/651,136, filed on Mar. 31, 2018.

(51) Int. Cl.
*B29C 64/209* (2017.01)
*B29C 64/118* (2017.01)
(Continued)

(52) U.S. Cl.
CPC ......... *B29C 64/118* (2017.08); *B29C 64/209* (2017.08); *B29C 64/232* (2017.08);
(Continued)

(58) Field of Classification Search
None
See application file for complete search history.

(56) References Cited

U.S. PATENT DOCUMENTS

2015/0140150 A1*  5/2015  Schmehl ............... B29C 48/92
                                                            425/150
2015/0147424 A1   5/2015  Bibas
(Continued)

FOREIGN PATENT DOCUMENTS

KR        2018/0001340 A       1/2018

OTHER PUBLICATIONS

International Search Report in International Application No. PCT/US2019/024997, dated Jul. 22, 2019.

*Primary Examiner* — Alison L Hindenlang
*Assistant Examiner* — Asha A Thomas
(74) *Attorney, Agent, or Firm* — Cognition IP, P.C.; Edward Steakley

(57) ABSTRACT

Apparatuses and methods for calibrating a 3D printer are disclosed. A 3D printer toolhead may include mechanisms for detecting when a portion of the toolhead comes into contact with a build surface. A process for detecting the distance from the toolhead to the build surface is disclosed using these mechanisms. A further method of calibrating a 3D printer by measuring a plurality of points on a build surface is also disclosed.

9 Claims, 7 Drawing Sheets

(51) Int. Cl.
*B29C 64/232* (2017.01)
*B29C 64/245* (2017.01)
*B29C 64/393* (2017.01)
*B29C 64/236* (2017.01)
*B29C 64/35* (2017.01)
*B33Y 10/00* (2015.01)
*B33Y 30/00* (2015.01)
*B33Y 50/02* (2015.01)

(52) U.S. Cl.
CPC .......... *B29C 64/236* (2017.08); *B29C 64/245* (2017.08); *B29C 64/35* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2015/0375453 A1 | 12/2015 | Yost et al. |
| 2016/0193785 A1 | 7/2016 | Bell et al. |
| 2017/0050382 A1 | 2/2017 | Minardi et al. |

\* cited by examiner

3D PRINTER CALIBRATION

CROSS-REFERENCE TO RELATED APPLICATIONS

This application is a 35 U.S.C. § 371 national stage application of PCT International Application No. PCT/US2019/024997, filed on Mar. 29, 2019, which claims the benefit of U.S. Provisional Patent Application No. 62/651,136, filed Mar. 31, 2018, which is hereby incorporated by reference in its entirety.

FIELD OF INVENTION

The present disclosure relates to 3D printer calibration and more particularly to apparatuses and methods for automatically measuring the distance between the tip of the hot end nozzle and the top of the build surface.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

3D printers deposit materials layer by layer to create a printed object. Some 3D printers can deposit very thin layers of materials, in the range of tens or hundreds of microns. As such, it is imperative that the location of the 3D printer head nozzle is known and controlled to a very high degree of precision.

A first layer of a 3D printed object is deposited on a build surface, while subsequent layers are layered on top of previous layers. Any discontinuity, imperfection, or misalignment of the build surface therefore affects the entirety of the 3D printed object. Therefore, 3D printers may include the capability to calibrate for the position of the build surface.

One method of calibrating the distance between the build surface and the nozzle tip is to manually or semi-automatically move the hot end to fixed points on the bed, and turn adjustment screws connected to the build surface to make small adjustments in the Z direction to correct for any skew such that the plane of the build surface is parallel to the plane of the X-Y gantry movement. In one known method, the four corners of the rectangular build area are adjusted in this way. This method assumes that the build surface is perfectly planar, and only addresses compensating for the position of the build surface. For larger build areas in the X-Y plane, it is often difficult, prohibitively expensive, or impossible to ensure that the surface is perfectly planar due to manufacturing and part tolerances. Thus this manual bed adjustment method alone would be insufficient to ensure a good first layer deposition during a print job.

Other known printers have a separate sensor element in proximity to the hot end to measure the distance between the sensor and the bed. Examples of such sensors include capacitive, inductive, IR, hall effect, piezoelectric, conductive, or electromechanical sensors. By knowing the distance between the hot end and the sensor tip, simple arithmetic then gives the value of the distance between the hot end and the bed. This approach requires manual intervention by the user to determine the distance between the sensor and the nozzle tip. Furthermore, sensing mechanisms may have issues with repeatability in measurement. Due to differential thermal expansion of different materials, the distance between the sensor and the nozzle tip may vary depending on operating conditions. Some sensor types, such as inductive sensors, only trigger in the presence of certain materials which limits the type of build surface or substrate that can be used. Finally, some sensor types exhibit decreased performance or malfunction entirely in a high-temperature environment which may be required for 3D printing high performance thermoplastics.

Other known 3D printers have used electrical conductivity between the nozzle tip and the build surface to determine the distance between the two. A disadvantage with this approach is that not all substrates commonly used in 3D printing are electrically conductive. In fact, the most desirable substrates are specifically non-conductive polymeric films. Some known printers provide cutouts to reveal a conductive surface underneath the build surface, but this creates effective dead zones where a part may not be printed. Some known 3D printers use specialized conductive polymeric films but are expensive and raise the cost of a printer job. Furthermore, plastic and burnt residue tends to build up on the nozzle tip which may create artificial spacing between the nozzle tip and build surface or prevent electrical conductivity altogether which may compromise the calibration process. Other known 3D printers use a sensor mechanism in the bed assembly itself such as a piezoelectric, strain gauge, accelerometer, or other type of sensor which can detect contact with the nozzle top, but again these tend to be prone to degradation at high temperatures or are difficult to calibrate.

Yet other 3D printers contain the entirety of the sensing mechanism within the toolhead assembly itself, but the mechanical designs of existing implementations do not sufficiently constrain movement of the hot end assembly leaving it vulnerable to movement from vibration and acceleration during the print process which is detrimental to part quality.

SUMMARY

Apparatuses and methods are disclosed for calibrating a 3D printer. Specifically, embodiments disclosed herein provide for automatically measuring the distance between a 3D printer nozzle and a build surface at various points to create a topographical map of the build surface. This topographical map may then be employed to make the necessary adjustments during printing to ensure that the material is deposited precisely.

In an embodiment, a 3D printer toolhead apparatus includes a hot end assembly attached to a hot end mounting block and a sensor block attached to a toolhead mounting plate. Between the sensor block and the hot end mounting block is a linear travel mechanism connected to the hot end mounting block and the sensor block configured to allow the hot end mounting block to move along a first axis relative to the sensor block and restrict translational or rotational movement of the hot end mounting block relative to the sensor block. A sensor is attached to the sensor block configured to produce a signal in response to the hot end mounting block being at a first position along the first axis, and a return mechanism provides a force to restore the hot end mounting block to a second position along the first axis in the absence of opposing forces.

Implementations may include one or more of the following features. In an embodiment, the linear travel mechanism includes two or more shafts affixed to the sensor block and two or more corresponding linear bushings attached to the hot end mounting block and configured to receive the two or more shafts. In another embodiment, the linear travel mechanism includes a key integral to the hot end mounting block and a corresponding keyway integral to the sensor block configured to receive the key. In some embodiments, the 3D printer toolhead apparatus includes one or more compression springs that are more compressed at the first position than at the second position.

In some embodiments, the 3D printer toolhead apparatus further includes a linear travel limiter mechanism in communication with the hot end mounting block and the sensor block which constrains travel of the hot end mounting block along the first axis between the first position and the second position.

In some embodiments, the hot end mounting block is integral to the hot end assembly. In some embodiments, the sensor block is integral to the toolhead mounting plate. In an embodiment, the sensor is a limit switch positioned to complete an electrical circuit when the hot end mounting block is at the first position and to break the electrical circuit when the hot end mounting block is not at the first position. In embodiments including a limit switch as a sensor, the repeatability of limit switch may be at least half the minimum thickness that the 3D printer toolhead is capable of depositing.

One general aspect of the disclosure includes a method for calibration of a 3D printer including automatically measuring the distance between the tip of a hot end nozzle of a 3D printer and the top of a build surface at various points to create a topographical map of the build surface. In some embodiments, during printing of a 3D object by the 3D printer, the 3D printer compensates for the contour of the build surface based on the topographic map of the build surface to ensure that the first layer of material being deposited on the build surface is of near uniform thickness. In some embodiments, this compensation is only along one axis, such as the Z axis. In some embodiments, the amount of compensation applied is decreased with each successive layer deposited after the first layer.

In some embodiments, the distance between the tip of the hot end nozzle of the 3D printer and the top of the build surface is measured by detecting contact between the tip of the hot end nozzle of the 3D printer and the top of the build surface. The method where the compensating includes compensating for at least one of: surface roughness of the build surface, skew of the build surface, and translation of the build surface.

The method for calibration of a 3D printer may include receiving, by a control unit, a command to calibrate the 3D printer; determining, by the control unit, a set of coordinates in a two-dimensional plane corresponding to a build surface; and measuring the distance between the tip of a hot end nozzle of the 3D printer and the top of the build surface at each of the coordinates.

Measuring the distance between the tip of a hot end nozzle of the 3D printer may include moving a toolhead assembly to the two-dimensional coordinate, moving the toolhead assembly along a first axis orthogonal to the two-dimensional plane in the direction of the build surface (i.e., the Z axis), and detecting that the toolhead assembly has made contact with the build surface. At the moment of contact, the three-dimensional coordinates of the toolhead may be determined and stored by the 3D printer control unit. The control unit may store the coordinates as a topographic map corresponding to the contour of the build surface.

In some embodiments, the toolhead, build surface, and build chamber may be pre-heated to a calibration temperature prior to calibration. In some embodiments, a nozzle tip of the toolhead assembly may be cleaned prior to calibration.

The above described apparatuses and methods may be used to ensure accurate, repeatable measurements of the build surface irrespective of surface material or flatness. The embodiments described herein present a compact and efficient approach to measuring a build surface that avoids the added bulk and complexity of an entirely separate probe. Incorporating an entirely separate probe would add bulk and complexity to the toolhead assembly which would require additional mounting hardware, space for the probe, and extra wiring. The toolhead requires somewhat frequent user interaction to replace parts of the hot end assembly as it is a wear component, so minimizing the complexity of the toolhead assembly is generally considered good practice.

The embodiments described herein are also compatible with any build surface material. The build surface may be made from a variety of materials including but not limited to glass, metal, resin, epoxy, other polymeric materials, fiberglass, composites, or tape. Certain sensors such as inductive, capacitive, or hall-effect rely on certain metal materials being present to function at all or experience a decrease in performance and accuracy with non-ideal materials. The embodiments described herein present an advantage over previously known systems which require special materials to work. Because accurate and repeatable measurements on the order of 10's of microns are necessary, utilizing physical contact as detection mechanism provides an advantage over known systems.

Furthermore, the embodiments described herein are highly tolerant of high temperatures. For example, some embodiments may operate at temperatures of 200 C or more. Because many sensing technologies may not tolerate such high temperatures, the approach of this disclosure does not require sensitive electronic components that may fail completely or have a significantly reduced service life at high temperatures. By avoiding use of these types of sensors altogether, the theoretical max operating temperature is only limited by the materials of construction.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Apparatuses and methods for calibrating a 3D printer are disclosed. A 3D printer may include a build surface and a toolhead. The 3D printer moves the toolhead over the build surface, depositing material to build up a 3D object on the build surface. The toolhead includes a hot end assembly and an extruder. The extruder drives a filament material through a heating element, forcing the liquefied or pliable filament out of a nozzle.

A suitable filament material is pliable or moldable above a certain temperature, and solid at lower temperatures. Examples of filament materials include thermoplastics, metals, and other such materials. A filament material is heated to a pliable temperature by the hot end assembly and deposited at a particular place to form a 3D printed object. This process of 3D printing may also be referred to as fused filament fabrication or additive manufacturing. Due to the properties of the filaments used, the 3D printer process may occur at a high temperature of up to 200 C or more. In particular, high performance thermoplastics operate at these high temperatures.

The 3D printer deposits the extruded filament on a build surface. The build surface is the surface upon which material is deposited on during the printing process. For example, at the end of the printing process, a completed 3D printed object will be resting on the build surface. Build surfaces may be made of metal, a polymeric film, a layered adhesive, fiberglass, ceramic, foam, or other materials. In some embodiments, a build surface may be a replaceable layer on top of a rigid substrate. For example, a build surface may be a layer of polymeric film on top of a metal build plate. The build surface, build plate, and/or build substrate may be alternatively referred to as a bed. For the purposes of the discussion below, the term build surface is used to refer to any or any combination of build surface, build plate, build substrate, or bed.

Because the build surface may be a disposable material, or may be a permanent material that is exposed to the high temperatures and stresses of additive manufacturing, the build surface may not be perfectly flat. For high precision 3D printing, the variability of the build surface may lead to an inconsistent first deposited layer. Other possibilities is that the build surface may not be perfectly aligned, i.e., it may be skewed or misaligned with the toolhead.

Figure 1:
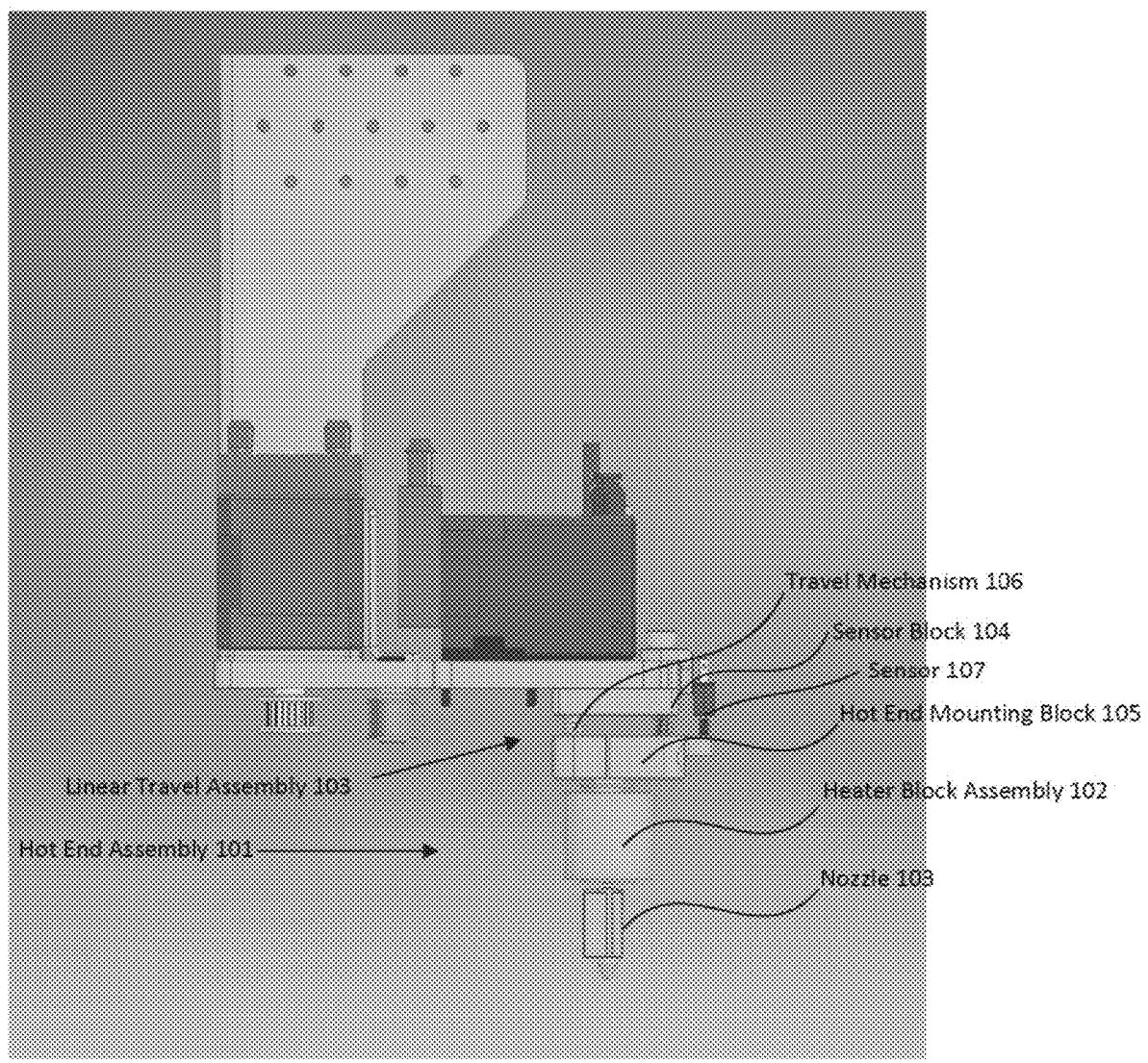
FIG. 1 illustrates a toolhead assembly 100 of a 3D printer according to an embodiment.

FIG. 1 illustrates a toolhead assembly 100 of a 3D printer according to an embodiment. Hot end assembly 101 includes heater block assembly 102 and nozzle 103. Hot end assembly 101 is rigidly mounted to linear travel assembly 103. Linear travel assembly 103 includes sensor block 104, hot end mounting block 105, and travel mechanism 106. Hot end assembly 101 may be secured to the mounting block via clamping, threading, set screw, or press fit. In some embodiments, the hot end mounting block is integral to the hot end assembly. In some embodiments, the sensor block is integral to the toolhead mounting plate. Travel mechanism 106 enables the hot end mounting block 105 to move relative to sensor block 104 in only one axis, limiting any other rotational or translational movement. Sensor block 104 is mounted to a toolhead plate and may contains thru-holes for bolts to mount it to the toolhead plate above it, a thru hole for the filament path from the extruder to the hot end, and additional mounting holes for a sensor 107.

Sensor 107 is mounted to sensor block 104 and configured to detect the travel of hot end mounting block 105 relative to sensor block 104. In an embodiment, sensor 107 is configured to generate a signal when hot end mounting block is at a pre-determined distance from sensor block 104. Sensor 107 may be subjected to high temperatures involved in thermoplastic extrusion.

In an embodiment, sensor 107 may comprise a electromechanical limit switch positioned such that the switch is actuated when the switch trigger comes into contact with hot end mounting block 105. As a result, an electrical circuit is completed when the switch comes into contact with hot end mounting block 105, indicating that the hot end assembly 101 has moved past a certain point relative to sensor block 104. The sensitivity and repeatability of a limit switch in this embodiment is selected to be compatible with the 3D printing process used in the 3D printer. Specifically, the sensitivity and repeatability is selected to be less than the thinnest layer that is able to be deposited by the 3D printer. For example, if the 3D printing process is capable of depositing a layer of a 100 micron thickness, the sensitivity and repeatability of the limit switch should be 50 microns or less to ensure that the measurement error introduced by the limit switch is less than the minimum thickness deposited by the 3D printer.

In some embodiments, sensor 107 may be a simple electrical contact between a component of sensor block 104 and a component of hot end mounting block 105. In this embodiment, the mechanical properties of travel mechanism 106 serve to keep the electrical contacts apart at rest. The electrical contacts are positioned such that they make contact when travel mechanism 106 is depressed. In these embodiments, the combination of the mechanical properties of travel mechanism 106 and the electrical properties of the electrical contacts act as a type of electromechanical switch serving a similar function as an electromechanical limit switch. In these embodiments, the electrical contacts may be electrically isolated from the rest of the 3D printer.

In an embodiment, a trigger distance adjustment bolt is one electrical contact and the sensor block 104 or some conductive component integral to the sensor block 104 is the other electrical contact. An electrical circuit attached to the two electrical contacts may include a low voltage direct current (DC) voltage source. For example, a voltage of between 1 VDC and 50 VDC may be used.

Embodiments where sensor 107 comprises electrical contacts or a limit switch may include switch debouncing circuitry. If a limit switch it used, the limit switch device may include integral debouncing circuitry. When electrical components come into contact with each other, the transition from a no contact state (i.e., very high impedance) to a contact state (i.e., very low impedance) may not be a perfect discontinuity. For example, the physical materials may actually bounce off of one another, causing a momentary loss of contact immediately following an initial contact. Similarly, electrical arc may occur at a range slightly beyond physical contact and vary depending on contact surface imperfections and the properties of the material (i.e., air) in between the contact surfaces. This transition from no contact to contact typically is very fast, and the spurious effects described above also occur at a very fast rate. As a result, the effects of switch bounce are often observed as high frequency noise in the switch signal. This high frequency noise may cause electromagnetic interference (EMI) and interfere with the electrical circuit the switch is a part of and even radiate out and interfere with nearby electrical circuitry.

For all of these reasons, some embodiments may include switch debouncing circuitry to filter out any of this high frequency noise from the switch signal. In an embodiment, the switch debouncing circuitry may comprise a low-pass signal filter in series with sensor 107. The low-pass signal filter may comprise a passive $1^{st}$ or $2^{nd}$ order RC filter with a corner frequency of 50 hz or lower. In an embodiment, the corner frequency is at least 1 hz. Other embodiments of switch debouncing circuitry may include S-R latches, diodes, resistors, capacitors, other logic gates, or other suitable methods of reducing switch bounce effects.

Figure 2:
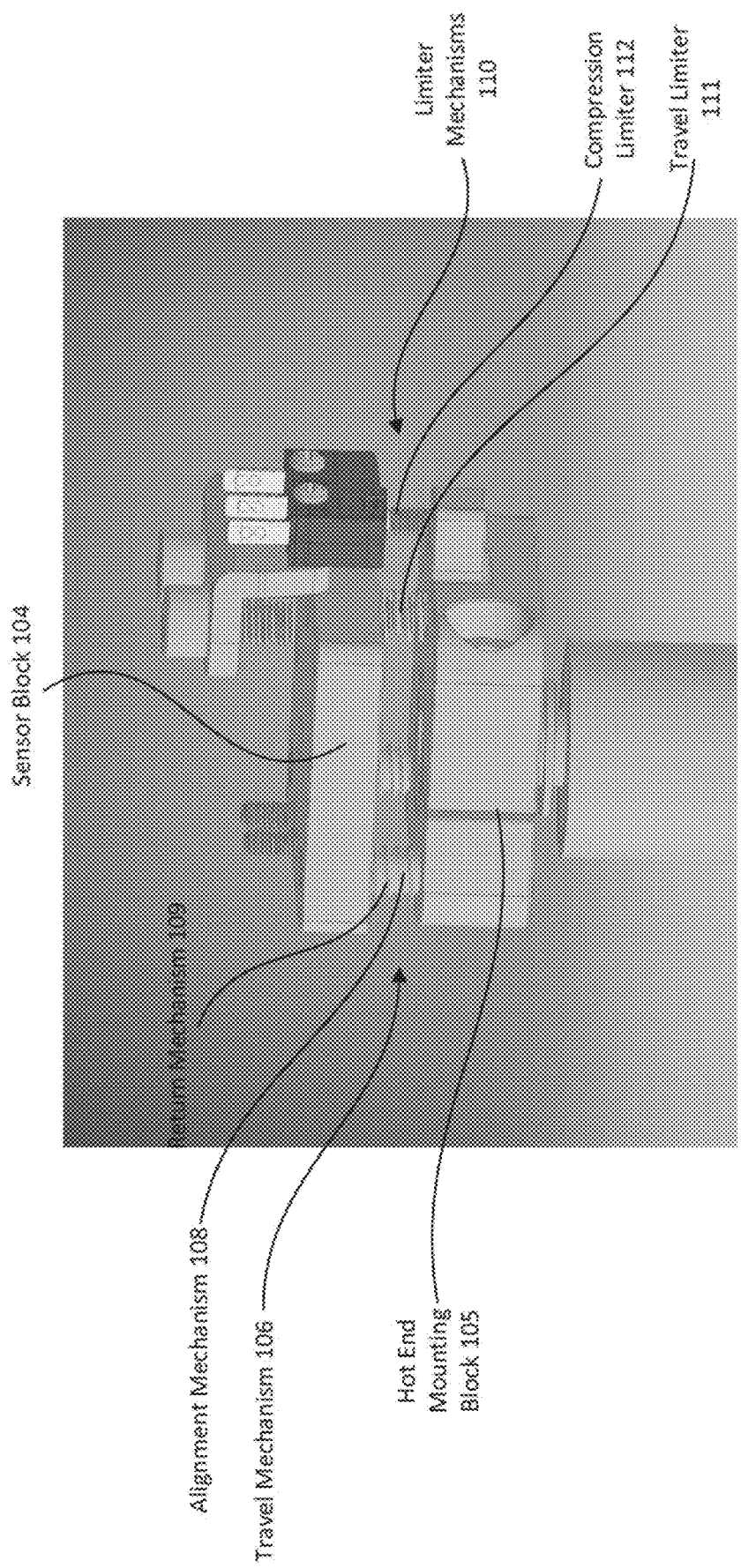
FIG. 2 illustrates a perspective view of a travel mechanism 106 according to an embodiment.

FIG. 2 illustrates a perspective view of a travel mechanism 106. Travel mechanism 106 includes alignment mechanism 108, return mechanism 109, and limiter mechanisms 110. Alignment mechanism 108 enables the hot end mounting block 105 to move relative to sensor block 104 in only one axis, limiting any other rotational or translational movement in any other axes. Return mechanism 109 ensures that after each probing event, the hot end returns to the same starting location.

In a Cartesian coordinate system, alignment mechanism 108 may serve to allow hot end mounting block 105 to translationally move along the Z axis but limit translational motion in either the X or Y axis as well as rotational motion about the Z axis. In this way, alignment mechanism 108 may be described as a one degree of freedom (1 DOF) device. Any other permitted movement of the hot end attached to hot end mounting block 105 may result in the hot end shifting and vibrating during the printing process, especially during high speed or frequent accelerations which may translate into defects on the printed part.

In an embodiment, alignment mechanism 108 comprises two shafts affixed to Sensor block 104 and two corresponding shaft bushings affixed or integral to hot end mounting block 105 accepting the shafts. Each individual shaft and shaft bushing pair serves to limit X and Y translational motion while allowing translational motion along the Z axis. The system of two shaft and shaft busing pairs, aligned in the Z axis and disposed along the X-Y plane, serve to limit any rotational motion of hot end mounting block 105 about the Z axis. In some embodiments, more than two shaft and shaft bushing pairs may be used. In some embodiments, the shafts may be affixed or integral to hot end mounting block 105 and shaft bushings may be attached to Sensor block 104.

In an embodiment, alignment mechanism 108 comprises a key machined into hot end mounting block 105 and a mating keyway machined into Sensor block 104. Similarly, in another embodiment, alignment mechanism 108 comprises a key machined into Sensor block 104 and a mating keyway machined into hot end mounting block 105. In some embodiments, the key and keyway pair may comprise a shroud where one piece (i.e., either the hot end mounting block or the sensor plate) encompasses the other piece. In yet another embodiment, alignment mechanism 108 may comprise one or more linear guides or linear bearings. Such linear guides or bearings may be mounted between hot end mounting block 105 and Sensor block 104 or mounted alongside the hot end mounting block 105 and Sensor block 104. In any embodiment including a keyway, shroud, linear guide, or linear bearing, any contact surfaces of either piece may be coated with a low friction material so as to limit friction when the pieces move in relation to one another.

Travel mechanism 106 includes return mechanism 109 to return the hot end to the same starting location after each probing event. In some embodiments, return mechanism 109 includes one or more compression springs placed between hot end mounting block 105 and sensor block 104. In an embodiment, the compression springs may be coaxially aligned with an alignment mechanism such as a shaft and linear bushing so as to produce force directed along the axis of the alignment mechanism. Travel mechanism 106 may also include limiters to place limits on the movement of the hot end mounting block 105 and sensor block 104 relative to one another. For example, travel mechanism 106 may include compression limiter 112 to limit how far the travel mechanism may compress and travel limiter 111 at the opposite end to establish a maximum travel distance. In an embodiment that includes a limiter switch as a sensor, for example, compression limiter 112 may be positioned to engage the limit switch at a set distance of travel. In an embodiment with a compressive spring providing a separating force between the hot end mounting block 105 and sensor block 104, travel limiter 111 may establish a maximum travel to prevent the hot end mounting block 105 from detaching from the sensor block 104. This maximum travel also then corresponds to a resting position for the toolhead assembly during printing.

The limiters may comprise threaded portions which allow for adjustment over time. Properties of the mechanical components of the travel mechanism (e.g., compression springs) may creep over time and as such allowing adjustment of the limiters in this way increases the usable life of the assembly before replacement is required. In an embodiment, travel limiter 111 is a bolt threaded into sensor block 104 that passes freely through a hole in hot end mounting block 105 and terminates in a larger diameter that cannot pass through the hole (e.g., such as a bolt head or nut). By adjusting the amount of the bolt threaded into sensor block 104, the spacing between the hot end mounting block and the sensor block at rest (i.e., not in contact with a surface) can be adjusted. Adjusting the spacing in this manner also changes the preload on the compression springs that separate hot end mounting block 105 and sensor block 104, which changes the amount of trigger force required to push the hot end mounting block up.

In an embodiment, compression limiter 112 may comprise a bolt threaded into sensor block 104 and positioned to engage sensor 107 at a predetermined travel distance. By adjusting the amount of the compressive limiter threaded into the sensor block 104, the point at which the sensor is engaged may be adjusted, allowing for fine adjustment of the sensor trigger distance.

Figure 3:
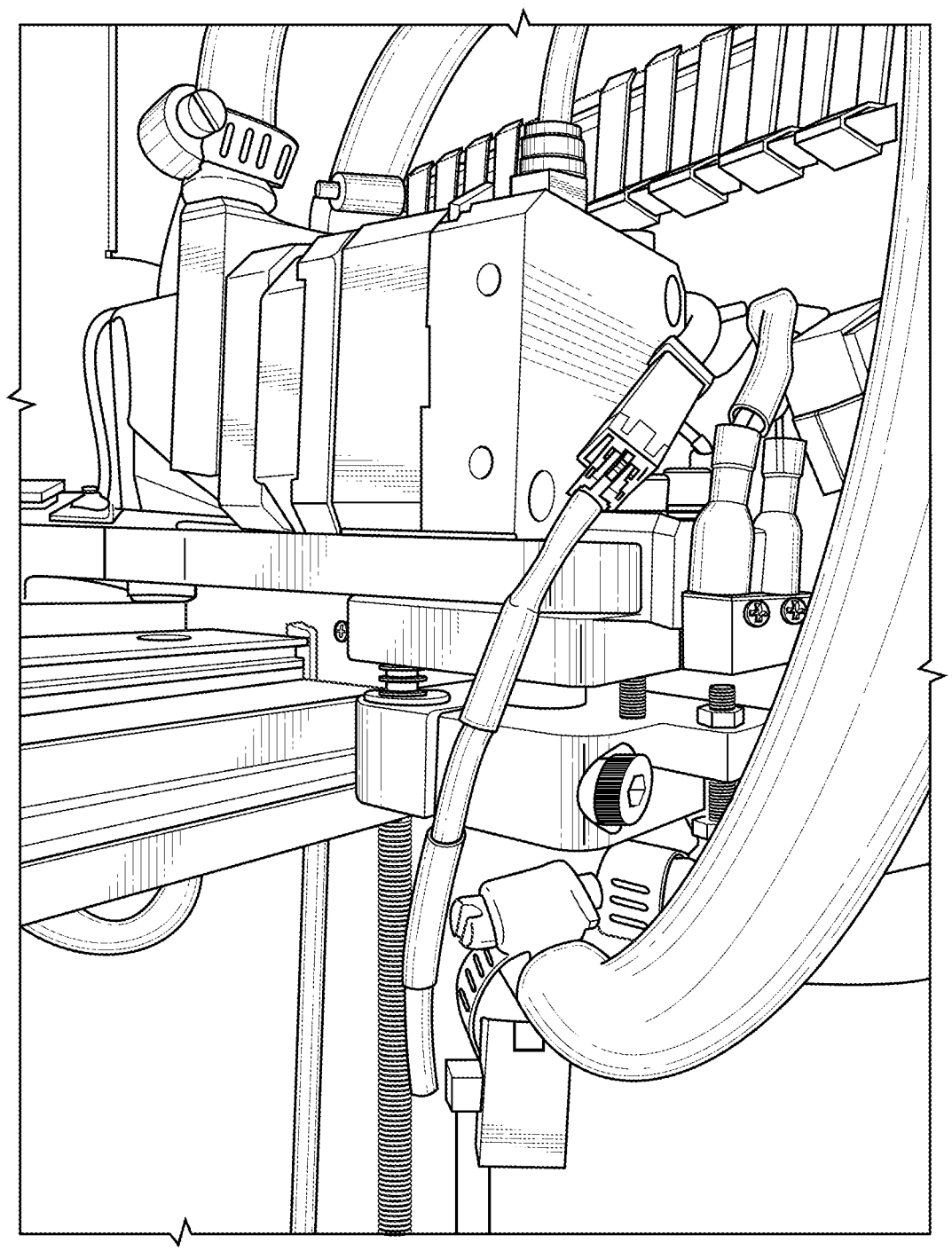
FIG. 3 illustrates a perspective view of a portion of a toolhead assembly of a 3D printer according to an embodiment.
Figure 4:
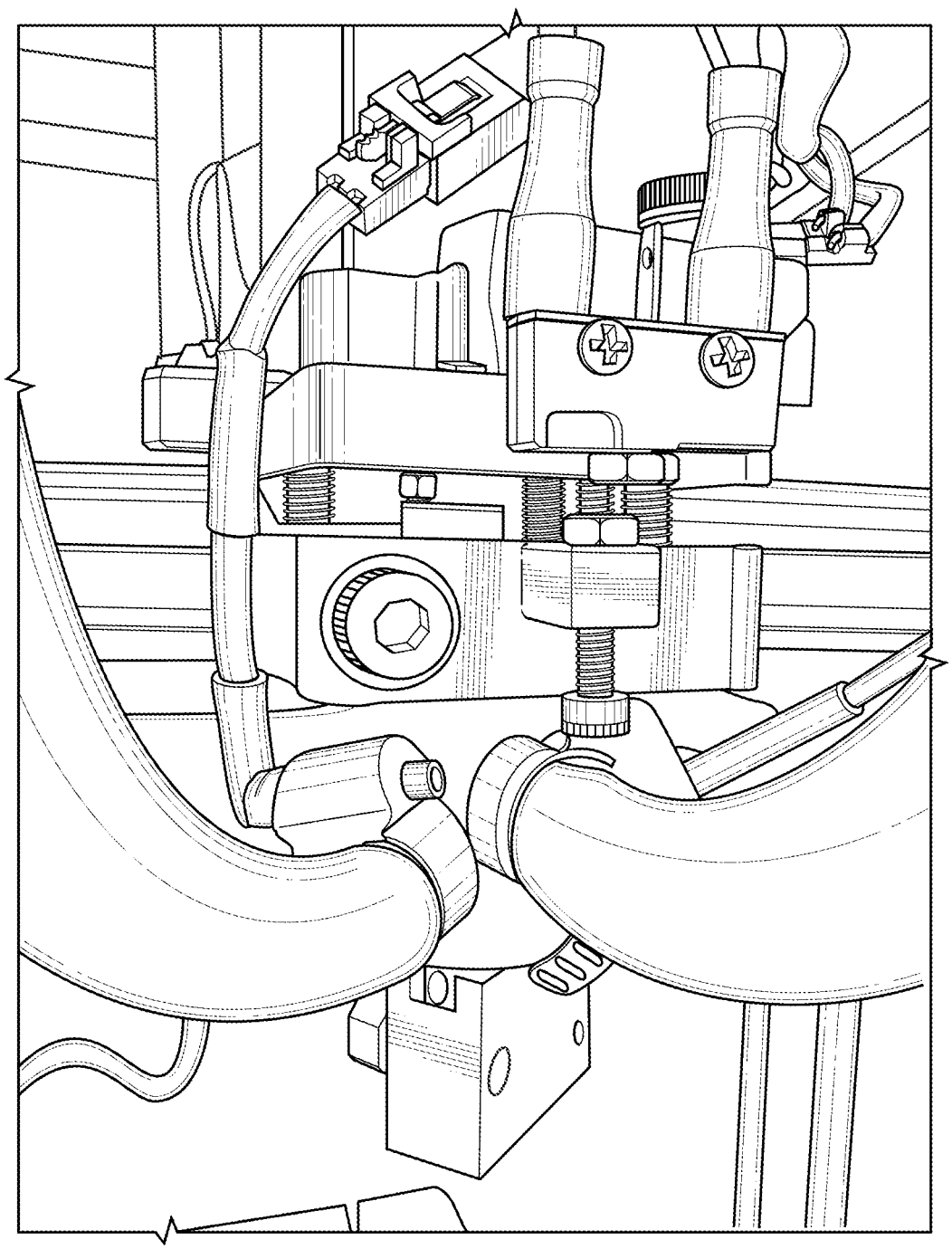
FIG. 4 illustrates a perspective view of a portion of a toolhead assembly of a 3D printer according to an embodiment.
Figure 5:
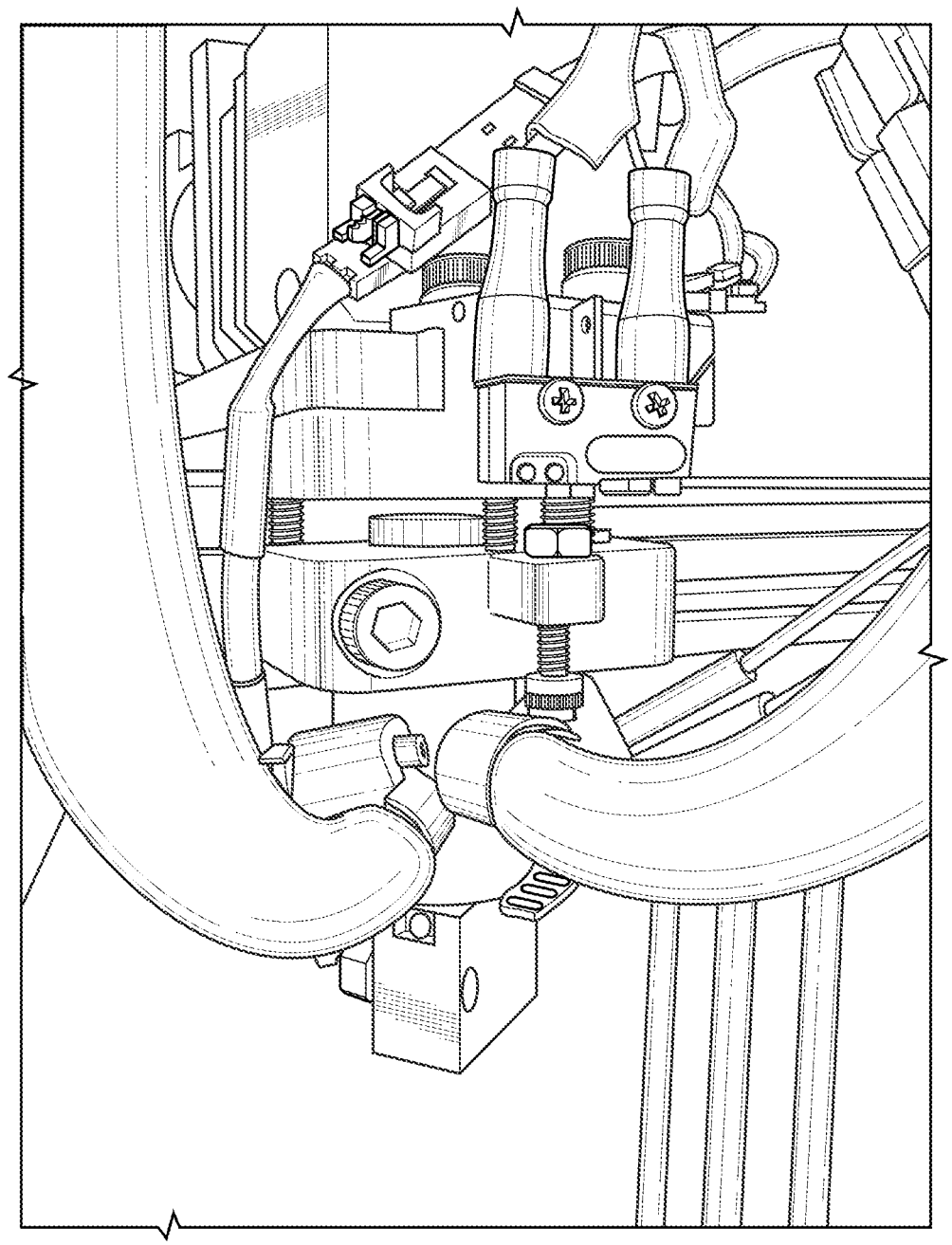
FIG. 5 illustrates a perspective view of a portion of a toolhead assembly of a 3D printer according to an embodiment.

FIG. 3 illustrates a perspective view of a portion of a toolhead assembly of a 3D printer according to an embodiment. FIGS. 4 and 5 illustrate an alternative perspective view of a portion of a toolhead assembly of a 3D printer according to an embodiment. In these views, components of FIG. 2 are shown in context of a 3D printer apparatus.

Figure 6:
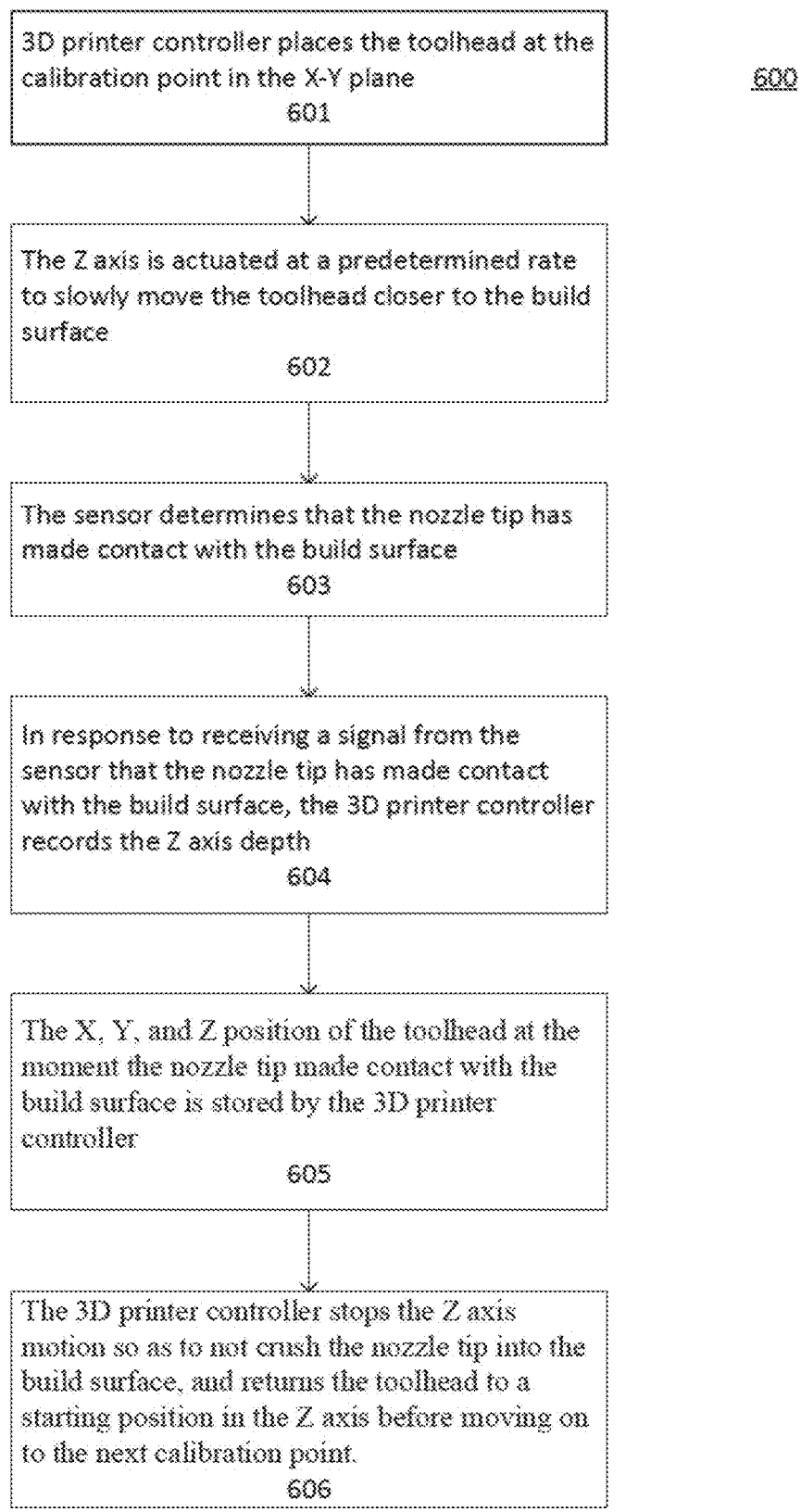
FIG. 6 illustrates a method for determining the distance between the nozzle tip and the bed surface according to an embodiment.

The distance between the nozzle tip and the bed surface is determined at each one of the set of calibration points according to method 600 illustrated in FIG. 6. At step 601, a 3D printer controller places the toolhead at the calibration point in the X-Y plane. The 3D printer controller is a computer that controls the movement of the toolhead assembly in three dimensions and can detect the location of the toolhead assembly in three dimensions. At step 602, the Z axis is actuated at a predetermined rate to slowly move the toolhead closer to the build surface. In some embodiments, the build surface is moved in the Z axis while the toolhead and X-Y gantry is stationary in the Z axis. In other embodiments, the build surface is stationary in the Z axis while the toolhead and X-Y gantry is moved along the Z axis. As the toolhead moves toward to build surface, at some point the nozzle tip makes contact with the build surface. At step 603, the sensor determines that the nozzle tip has made contact with the build surface. In response to receiving a signal from the sensor that the nozzle tip has made contact with the build surface, the 3D printer controller records the Z axis depth at step 604. At step 605, the X, Y, and Z position of the toolhead at the moment the nozzle tip made contact with the build surface is stored by the 3D printer controller. Also in response to receiving the signal from the sensor that the nozzle tip has made contact with the build surface, at step 606 the 3D printer controller stops the Z axis motion so as to not crush the nozzle tip into the build surface, and returns the toolhead to a starting position in the Z axis before moving on to the next calibration point.

Figure 7:
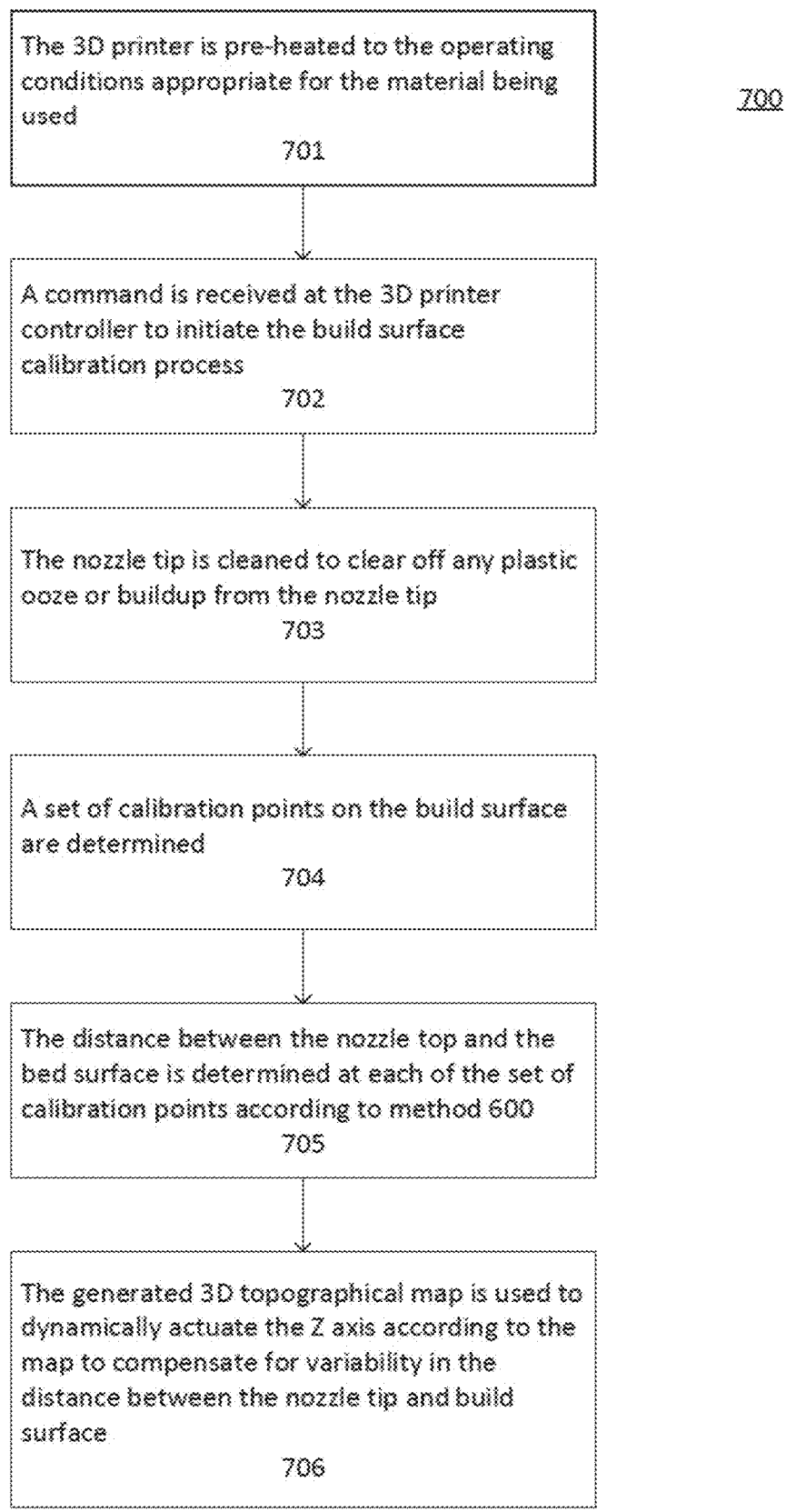
FIG. 7 illustrates a method 700 for calibrating a 3D printer according to an embodiment.

FIG. 7 illustrates a method 700 for calibrating a 3D printer. Specifically, method 700 measures the distance between the tip of a hot end nozzle and the top of a build surface at various points to create a topographical map of the build surface such that the 3D printer can make adjustments during the print process to ensure that the first layer of material being deposited on the build surface is of near uniform thickness.

At step 701, the 3D printer is pre-heated to the operating conditions appropriate for the material being used. The hot end, bed, build surface, and build chamber are heated such that all the components undergo thermal expansion before beginning the calibration process. Some embodiments using high performance thermoplastics filaments use a heated build chamber to reduce the amount of stress development in the part during the build process which can result in warped geometries and an unusable part. This heating however also causes thermal expansion of all the components inside the chamber, which means that all components inside the chamber may experience thermal expansion. As such, the calibration and measurement done in a "cold" state will be rendered useless at high temperatures. Specifically, in some embodiments, the hot end, chamber, and bed temperatures required for printing can differ drastically between different materials which means from print-to-print, the distance between the nozzle tip and build surface can vary as much as 2 mm, which is 10 times greater than the average layer thickness. Accordingly, at step 701, the 3D printer is pre-heated to an operating temperature prior to calibration.

At step 702, a command is received at the 3D printer controller to initiate the build surface calibration process. The 3D printer controller is a computer that controls the movement of the toolhead assembly in three dimensions. At step 703, the nozzle tip is cleaned to clear off any plastic ooze or buildup from the nozzle tip. In an embodiment, the printer moves the toolhead over a nozzle tip wiper assembly to clean it.

At step 704, a set of calibration points on the build surface are determined. In an embodiment, the calibration points are arranged in a rectangular grid pattern such as a 3×3 grid with a total of 9 points. Other embodiments may use any number of calibration points arranged in any manner. At step 705, the distance between the nozzle top and the bed surface is determined at each of the set of calibration points according to method 600 illustrated in FIG. 6. Each measured distance is stored in a 3D topographical map that corresponds to the build surface.

At step 706, the generated 3D topographical map is used to dynamically actuate the Z axis according to the map to compensate for variability in the distance between the nozzle tip and build surface, ensuring a consistent deposition of material. In some embodiments, the printer can gradually decrease the amount of compensation applied in the Z axis as the print progresses such that whatever offset was originally required for the first few layers does not apply to the entirety of the printed part as this would result in a skewed geometry.

While the above description has been made in relation to a single toolhead and nozzle tip, some embodiments may have multiple independently controllable toolheads. In these embodiments, the calibration process 700 may be run with each toolhead such that not only can the distance between the nozzle tip and the bed be measured, but the relative spacing between the nozzle tips of the different toolheads can also be measured automatically. The 3D printer controller may then store the measurements for various toolheads and apply the appropriate calibration for each toolhead after a change of toolhead. In some embodiments, the 3D printer includes a combination of fixed and independent toolheads. For example, there may be two or more independently actuatable toolheads, each comprising two or more hot ends and/or extruders, with each hot end incorporating this invention as a measurement probe.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A 3D printer toolhead apparatus, the apparatus comprising:
   a hot end mounting block, wherein a hot end assembly is attached to the hot end mounting block;
   a sensor block, wherein the sensor block is attached to a toolhead mounting plate;
   a linear travel mechanism connected to the hot end mounting block and the sensor block configured to allow the hot end mounting block to move along a first axis relative to the sensor block and restrict translational or rotational movement of the hot end mounting block relative to the sensor block;
   a sensor attached to the sensor block configured to produce a signal in response to the hot end mounting block being at a first position along the first axis; and
   a return mechanism which provides a force to restore the hot end mounting block to a second position along the first axis in the absence of opposing forces.

2. The 3D printer toolhead apparatus of claim 1, wherein the linear travel mechanism comprises two or more shafts affixed to the sensor block and two or more corresponding linear bushings attached to the hot end mounting block and configured to receive the two or more shafts.

3. The 3D printer toolhead apparatus of claim 1, wherein the linear travel mechanism comprises a key integral to the hot end mounting block and a corresponding keyway integral to the sensor block configured to receive the key.

4. The 3D printer toolhead apparatus of claim 1, wherein the return mechanism includes one or more compression springs that are more compressed at the first position than at the second position.

5. The 3D printer toolhead apparatus of claim 1, further comprising a linear travel limiter mechanism in communication with the hot end mounting block and the sensor block which constrains travel of the hot end mounting block along the first axis between the first position and the second position.

6. The 3D printer toolhead apparatus of claim 1, wherein the hot end mounting block is integral to the hot end assembly.

7. The 3D printer toolhead apparatus of claim 1, wherein the sensor block is integral to the toolhead mounting plate.

8. The 3D printer toolhead apparatus of claim 1, wherein sensor is a limit switch positioned to complete an electrical circuit when the hot end mounting block is at the first position and to break the electrical circuit when the hot end mounting block is not at the first position.

9. The 3D printer toolhead apparatus of claim 1, wherein a repeatability of the limit switch is at least half the minimum thickness that the 3D printer toolhead is capable of depositing.

* * * * *